July 5, 1932. E. D. TILLYER 1,865,714
OPHTHALMIC LENS
Filed Sept. 18, 1929
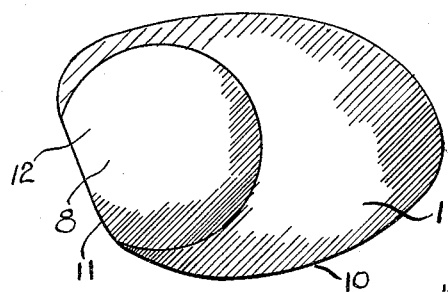
FIG. I
FIG. VI
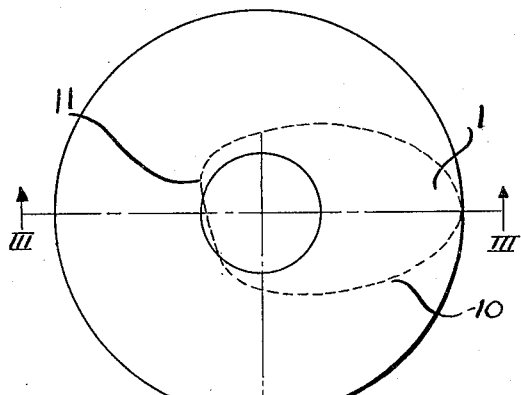
FIG. V
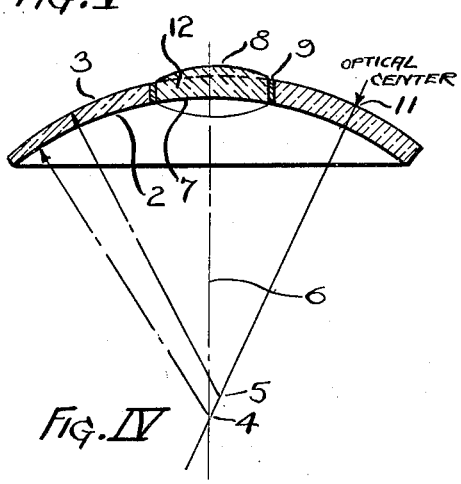
FIG. II
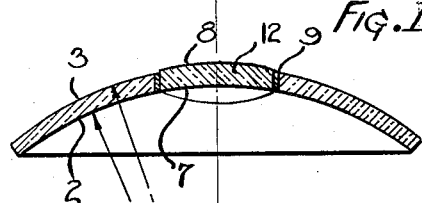
FIG. IV
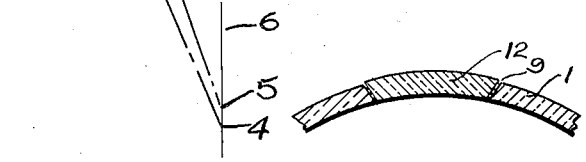
FIG. III
FIG. VII
EDGAR D. TILLYER
INVENTOR
BY Harry H. Styll
ATTORNEY Patented July 5, 1932

1,865,714

UNITED STATES PATENT OFFICE

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

OPHTHALMIC LENS

Application filed September 18, 1929. Serial No. 393,498.

This invention relates to ophthalmic lenses and has particular reference to an improved type of lens giving both eye-protection and eye-correction and the process of making the same.

The principal object of this invention is to provide in a large size protection lens any desired prescriptive power for eye correction.

Another objection of this invention is to enable the prescription element to be incorporated in such a manner that it will be very economical to manufacture a lens of this nature both as regards material and steps in the process.

Another object of this invention is to provide a semi-finished lens for the prescription shops which will only require the wearer's prescriptive power correction to be placed therein, thus standardizing the base portion, facilitating dispensing, and greatly reducing the cost of production.

Another object of this invention is to provide simple means of reducing astigmatic and prismatic effects to a negligible amount.

Another object of this invention is to provide means whereby any improvements such as marginal correction, glare reduction and surface quality may be incorporated with ease.

Other objects and advantages will become apparent from the following description taken in connection with the accompanying drawing and it will be apparent that many changes may be made in the details of the construction, arrangement of parts and steps in the process without departing from the spirit of the invention as expressed in the accompanying claim. I, therefore, do not wish to be limited to the exact details shown and described as the preferred forms only have been shown by way of illustration.

Referring to the drawing:

Fig. I is a front view of an ophthalmic lens embodying the invention.

Fig. II is a top or plan view of the blank at a certain stage in the process.

Fig. III is a section taken on line III—III of Fig. II.

Fig. IV is a sectional view similar to Fig. III but showing a modification.

Fig. V is a top or plan view showing the invention applied to a modified form of lens.

Fig. VI is a section taken on line VI—VI of Fig. V.

Fig. VII is a fragmentary sectional view of a slightly modified form of lens.

The large size lenses now customarily worn for aviation, automobiling, and other occupations have heretofore been of plain glass without prescriptive power. It is apparent that wearers of corrective lenses should not discard them when wearing protective lenses as the resultant eye-strain and in some cases, near-blindness, would be an obvious hazard and menace to the individual and others. Some wearers of prescription glasses have placed the protection mounting over them, but the added weight and annoying double reflections are two of the many disadvantages of this procedure which render it useless as a solution of the problem.

Another method has been to grind the prescription curves directly on to the protection lenses, but the large area to be covered together with the steep curve thereon to fit around the face has often made it impossible to grind the necessary curves to obtain even simple prescriptions. The cost of such lenses when successively ground is quite prohibitive, however, and altogether the method is of little value.

It is the prime object of this invention, therefore, to provide a lens and a process for making the same which will depart from the costly and often times unsuccessful methods of the prior art and be of simple, economical and efficient nature. I contemplate providing such a lens as will conform to all the modern developments and improvements in focal accuracy and manufacturing. In regard to the latter my improved lens may be made as a semi-finished blank by the manufacturer and shipped to the prescription dealer to place the necessary prescription power therein, thus expediting the service and lowering the cost to the wearer.

Referring to the drawing wherein similar reference numerals denote corresponding parts throughout the several views, the numeral 1 denotes the purely protective portion of my improved lens which is of a preferably spherical curvature and formed as shown in Figs. II and III from a meniscus blank. In forming my improved lens I first shape, by molding or other suitable method, the meniscus blank 1 having a concave curve 2 and convex curve 3 upon its surfaces. The curvatures 2 and 3 are preferably of substantially the same radius to give a blank of zero power and have their centers 4 and 5 respectively on the axial line 6. The optical and geometrical centers of the blank 1 will, therefore, be coincident and on line 6.

I next form by molding or other suitable method, an ordinary prescription lens blank 12 of preferably meniscus form. The prescription blank 12 may be finished, as is usual, with a standard base curve 7 and the wearer's prescription curve 8 on the other side.

I next pierce a hole 9 in the large blank with its center preferably coincident with the optical and geometrical centers previously named on line 6 and into this hole 9 I insert the small lens 12 leaving a small space around the edges. Into this space I pour a quantity of fusing flux 10 consisting preferably of a powdered soft glass having substantially the same coefficient of expansion as the glass of the blanks but of a lower melting point. It will be understood that the various glasses used may be of any well-known lens media, such as crown glass preferably.

Phosphate, sodium borate or a similar softener may be used to reduce the fusion point as I next apply heat in the usual way to fuse the two blanks together. A lower temperature may be used to fuse the blanks together by the use of the flux 10 which thereby avoids overheating and warped edges at the contact point. The uniting process may, of course, be carried out by other methods such as cementing.

Having fused the blanks together and made a single homogeneous one I have formed a large meniscus disc 1 having a prescription lens 12 in the center.

In order to obtain the necessary shape to suit the usual type of protective mounting I cut the outline 10 from the homogeneous blank so that the optical center on line 6 is near the nasal edge 11 or over the useful field of vision. It will be apparent that the remainder of the lens other than portion 12 will be of zero power and have clear vision there through. The curves 2 and 3 over this zero power portion 1 will not be changed by the prescriptive power correction and the zero power portion 1 of the lens will be thin enough to fit the frame and of light weight.

If desired the curves 2 and 3 may be so located that an optical center is formed substantially in the center of the clear vision portion as shown by Fig. IV where numeral 11 represents this optical center. The advantage of having a second optical center for this field is that prismatic displacement at the temporal side is obviously lessened by this procedure.

In forming this modified type I proceed much the same as in the previously described instance by forming a large meniscus blank 1 which, however, has the center 5 of the curvature 3 offset from the axial line 6 whereon the center 4 of the concave curvature 2 is located. As in the usual decentering practice the optical center 11 of the plano field may be located where desired by changing the position of center 5 with relation to center 4 as the optical center will always lie on a line passing through these two points.

Having formed the curves 2 and 3 of substantially the same radius, but decentered as described I can form a hole 9 with its center substantially coincident with the center line 6 as in the previous case, into which I insert any suitable prescription blank 12 with the fusing flux 10 as described and unite the two blanks together by heat. The lens 12 may, of course, be cemented if desired.

By means of my invention a great reduction in the cost of manufacturing prescriptive power protection lenses is possible. The zero power portion 1 with the pierced hole 9 may be made in quantities and shipped by the large manufacturer to prescription dealers. The dealers merely have to grind an ordinary prescription lens 12 and either fuse or cement it into the hole 9 in the large blank 1 so that any wearer's prescription can be filled without loss of time by the small dealer. In the process of cementing the prescription blank 12 in position the hole 9 may well be of tapered shape as shown in Fig. VII if desired.

This process of placing a prescription lens before the useful field of vision in a protection lens may also be applied to a protection lens of cylindrical shape as distinguished from the preceding spherical or meniscus shape.

As shown in Figs. V and VI, the cylinder blank 13 is formed with curvatures 14 and 15 of similar radius on its surfaces and has a hole 16 into which I insert a prescription lens blank 17 as in the spherical type. This lens can also be cut to the outline 18 to suit any frame into which it is to be fitted.

As an alternative procedure the blank with the pierced hole may be first shaped to the outline shape to fit the desired form of mounting by the manufacturer and then have the prescription lens fitted therein by the dealer if desired. This process may be carried out with equal facility as the foregoing one and is of equal value as a means of providing an economical lens and process.

From the foregoing it will be apparent that I have provided an improved lens and process of making the same which does not have any of the drawbacks of the prior art and is of simple, economical and sturdy construction. The invention may be applied to many types of protection lenses and is of particular benefit on the type having a clear vision portion fitting around the outer canthus of the eye which acts as a protective covering and also a clear vision lens. This means to carry out the objects of the invention are well adapted thereto being of efficient and economical nature.

Having described my invention, I claim:

An ophthalmic lens having a length extending from the nasal canthus to beyond the temporal canthus of the eye when in place before the eye, comprising a visual field of substantially zero power having divergent surfaces and an optical center and having a recess therethrough adjacent the nasal edge and a second lens secured in said recess and having lens power surfaces on its opposite faces and having an optical center between the geometrical center of the lens and its nasal edge, said first optical center lying between the said geometrical center and the temporal edge.

EDGAR D. TILLYER.